US006876787B2

(12) United States Patent
Bruel et al.

(10) Patent No.: US 6,876,787 B2
(45) Date of Patent: Apr. 5, 2005

(54) DEVICE FOR TRANSMITTING AN OPTICAL WAVE IN A STRUCTURE PROVIDED WITH AN OPTICAL FIBER AND METHOD FOR MAKING SAME

(75) Inventors: Michel Bruel, Veurey Voroize (FR); Patrick Mottier, Grenoble (FR); Joël Alanis, Biviers (FR)

(73) Assignee: Opsitech--Optical System on a Chip, Grenoble (FR)

( * ) Notice: Subject to any disclaimer, the term of this patent is extended or adjusted under 35 U.S.C. 154(b) by 69 days.

(21) Appl. No.: 10/415,645

(22) PCT Filed: Nov. 9, 2001

(86) PCT No.: PCT/FR01/03480

§ 371 (c)(1),
(2), (4) Date: May 1, 2003

(87) PCT Pub. No.: WO02/39156

PCT Pub. Date: May 16, 2002

(65) Prior Publication Data

US 2004/0013340 A1 Jan. 22, 2004

(30) Foreign Application Priority Data

Nov. 10, 2000 (FR) .......................................... 00 14498

(51) Int. Cl.[7] .............................................. G02B 6/12
(52) U.S. Cl. ............................. 385/14; 385/16; 385/20; 385/49; 385/129
(58) Field of Search .............................. 385/14, 16–17, 385/20, 21, 49, 50, 32, 129–132

(56) References Cited

U.S. PATENT DOCUMENTS 5,239,601 A * 8/1993 Denis et al. .................. 385/49
5,612,815 A   3/1997 Labeye et al.
5,796,884 A   8/1998 Wingo

FOREIGN PATENT DOCUMENTS

| DE | 30 12 450 |   | 10/1981 |
|----|-----------|---|---------|
| EP | 0490095   | * | 6/1992  |
| EP | 0 490 095 |   | 6/1992  |
| EP | 0 639 782 |   | 2/1995  |
| EP | 0639782 A1| * | 2/1995  |
| EP | 0 859 260 |   | 8/1998  |
| FR | 2479993   | * | 10/1981 |

OTHER PUBLICATIONS

Von Karl–Heinz Tietgen, " Probleme der Topographie optischer Schaltungen" (Problems of Integrated Optics Topograpy), vol. 35, No. 9, 1981, pp. 247–252, XP002164038, ISSN: 0016–1136.

* cited by examiner

Primary Examiner—Leo Boutsikaris
(74) Attorney, Agent, or Firm—Young & Thompson (57) ABSTRACT

A device for transmitting optical waves has a structure having at least an optical guide element wherein the structure comprises hollow parts or notches (9, 10) adapted to receive the end parts (13, 14) of an optical fiber (12) such that the fiber spans the surface (11a) of the structure separating the hollow parts and the ends of the optical fiber are respectively optically coupled to optical guide elements (7, 8) of the structure. The invention also concerns a method for making such a device which consists in etching the notch by cutting off the end of the optical micro-guide. The device is useful for producing optical switches.

15 Claims, 8 Drawing Sheets

DEVICE FOR TRANSMITTING AN OPTICAL WAVE IN A STRUCTURE PROVIDED WITH AN OPTICAL FIBER AND METHOD FOR MAKING SAME

The present invention relates to the field of optical wave transmission in optical guiding structures.

Optical waveguides are used to transmit an optical wave, these usually consisting of optical fibers and/or integrated components which comprise optical micro-waveguides. The optical fibers generally comprise a core, which transmits the optical wave, surrounded by a tubular cladding, the refractive index of the material(s) making up the core being higher than the refractive index of the material making up the cladding. The integrated micro-waveguide components comprise a core, in general for transmitting the optical wave, formed between two layers, the refractive index of the material making up the core being higher than the refractive index of the material(s) making up these layers.

Various integrated optical micro-waveguide structures have been described in particular in patents FR-A-90/02575, FR-A-90/03902 and FR-A-95/00201. More particularly, patent FR-A-90/02575 describes a process for connecting the end of an optical fiber issuing from a multifiber optical cable to an integrated optical micro-waveguide in a structure.

The object of the present invention is to provide an optical wave transmission device for improving and increasing the number of optical wave transmission channels in a structure so as in particular to provide simplified multichannel switching structures of small size.

According to the present invention, the structure comprises hollowed parts or notches designed to receive and fix therein the end parts of an optical fiber in such a way that this optical fiber straddles the surface of the structure separating said hollowed parts and such that the ends of the optical fiber are optically coupled to optical guiding means of said structure respectively.

According to the invention, said hollowed parts may advantageously be produced on each side of at least one integrated optical waveguide of said structure, which extends below or is flush with the aforementioned surface.

According to the invention, at least one of the ends of the optical fiber may advantageously be optically coupled to integrated optical guiding means of said structure.

According to one embodiment of the invention, the structure has a deformable part provided with at least one auxiliary optical guiding means and an actuating means is designed to move this deformable part between a first position and a second position so that an end surface of this auxiliary optical guiding means is optically coupled either to one end of said optical fiber or to an end surface of an integrated optical waveguide of said structure which extends below the aforementioned surface.

According to another embodiment of the invention, the structure comprises a first integrated optical waveguide which extends below the aforementioned surface and second and third integrated optical waveguides which extend to the outside of this surface.

The structure preferably has at least two deformable parts provided respectively with an auxiliary optical guiding means and is provided with two actuating means designed to move the respective said deformable parts between a first position and a second position so that, on the one hand, an end surface of a first auxiliary optical guiding means is optically coupled either to an end surface of the first integrated optical waveguide or to an end surface of the second integrated optical waveguide and, on the other hand, an end surface of a second auxiliary optical guiding means is optically coupled either to an end surface of said optical fiber or to an end surface of the third integrated optical waveguide.

According to another embodiment of the invention, the structure supports two optical fibers and has two integrated optical waveguides. The structure has a deformable part provided with at least four auxiliary optical guiding means and is provided with an actuating means designed to move this deformable part between a first position and a second position so that an end surface of the auxiliary optical guiding means is optically coupled, selectively and respectively, to the two ends of the two optical fibers and the two ends of the two integrated optical waveguides.

According to the invention, said deformable part preferably comprises branches connected together, each of which is provided with an optical guiding means.

According to the invention, the end of said optical fiber is preferably optically coupled to the end surface of said auxiliary optical guiding means via an integrated optical guiding means of the structure.

According to a preferred embodiment of the invention, the deformable part comprises a cantilevered flexible beam, which supports the one or more auxiliary optical guiding means longitudinally, and stressing means for deforming this beam so as to move its end.

According to the invention, the stressing means preferably comprise capacitive means or inductive means that deliver a force for stressing said beam owing to the effect of an electrical current and/or an electrical voltage that are delivered by said control means.

The subject of the present invention is also a method for connecting an optical fiber to an integrated optical micro-waveguide in a structure.

According to the invention, this method consists in:
fabricating a structure comprising at least one optical micro-waveguide having one end;
hollowing out a notch in the form of a trench in the surface of said structure in the region of the end of said optical micro-waveguide by cutting away an end part of this integrated optical micro-waveguide; and
engaging, from above said surface of the structure, and fixing the end part of the optical fiber in said notch so that the transmission core of the optical fiber is optically coupled to the transmission core of the optical micro-waveguide, the fiber leaving said notch via a curved part.

According to the invention, the method preferably consists in hollowing out a notch, the shape of which provides lateral centering of the end part of the optical fiber.

According to the invention, the method preferably consists in hollowing out a notch having an end wall through which the optical micro-waveguide emerges and against which the end of the optical fiber bears.

Figure 1:
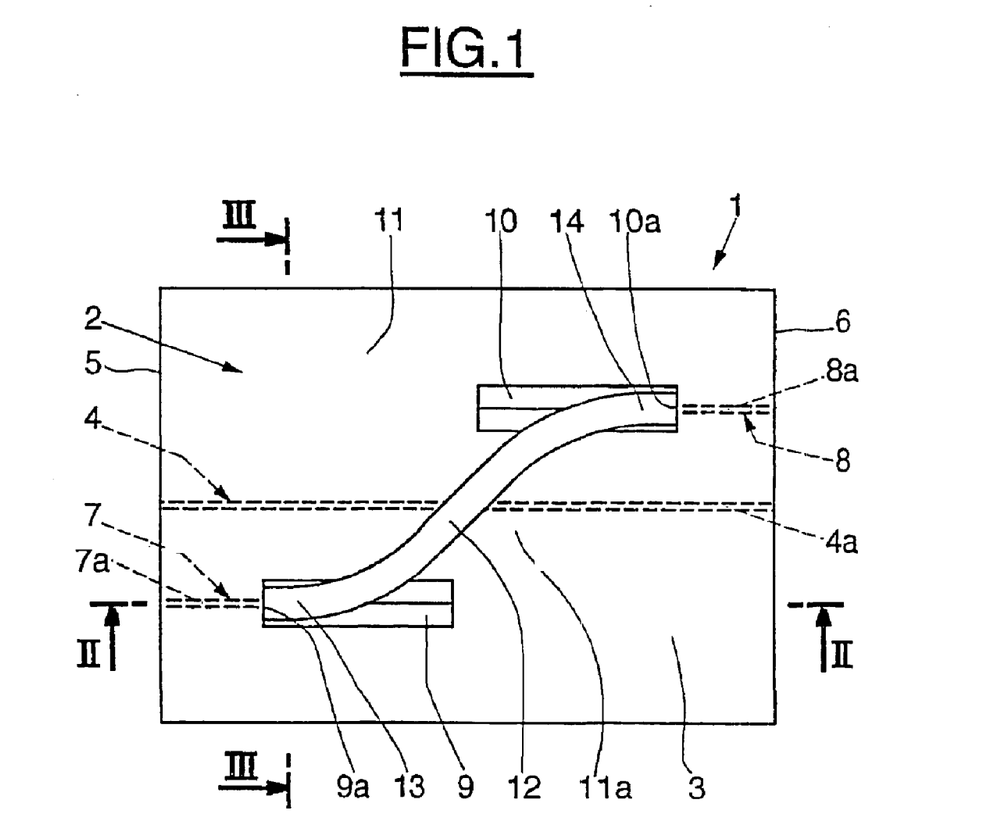
FIG. 1 shows a top view of a basic transmission device according to the present invention.
Figure 2:
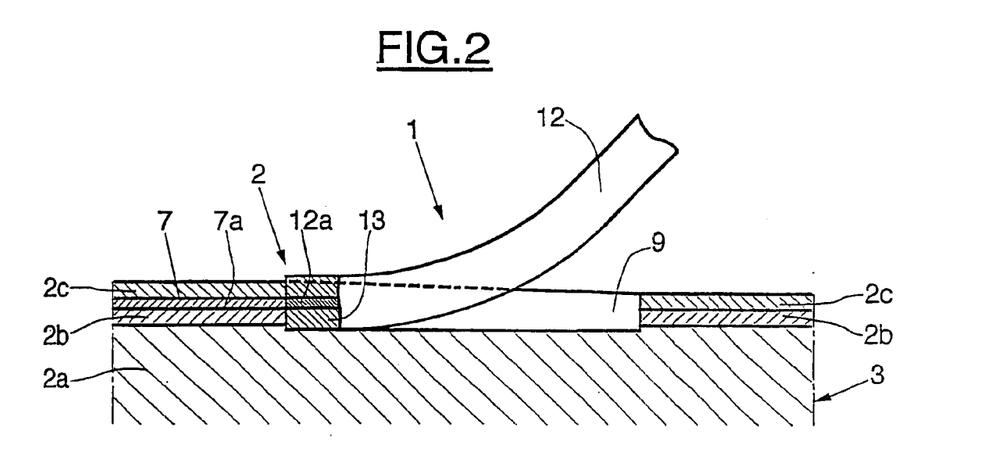
FIG. 2 shows a cross section on II—II of the transmission device in FIG. 1.
Figure 3:
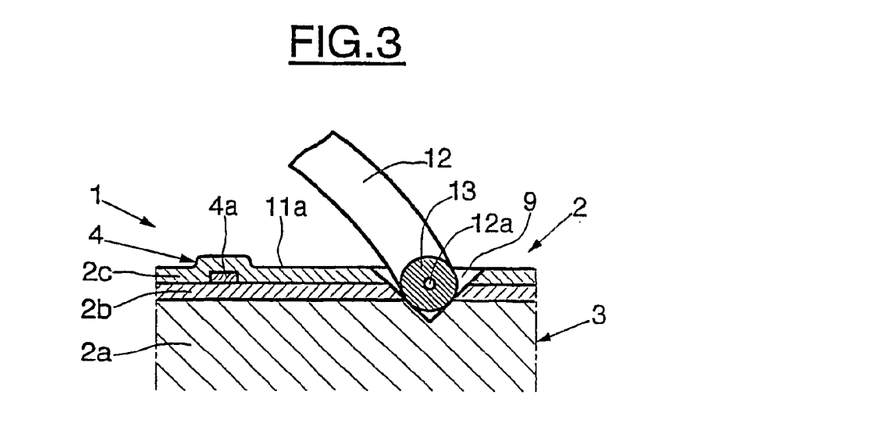
FIG. 3 shows a cross section on III—III of the transmission device in FIG. 1.

A better understanding of the present invention will be gained by studying the various optical wave transmission devices described by way of nonlimiting examples and illustrated by the drawing in which:

FIGS. 1 to 3 show an optical wave transmission device which comprises an integrated optical guiding structure 2 formed by a block 3 which comprises integrated micro-waveguides.

The structure 2 comprises an integrated micro-waveguide 4 that extends longitudinally, for example between two transverse boundaries 5 and 6 of the block 3.

The structure 2 furthermore comprises integrated micro-waveguide connecting portions 7 and 8 which extend longitudinally from the surfaces 5 and 6 of the block 3 respectively and which run into longitudinal notches 9 and 10 provided in the upper face 11 of the block 3, on each side of and at a certain distance from the optical micro-waveguide 4.

The end surfaces 9a and 10a of the notches 9 and 10 that contain end surfaces of the optical micro-waveguides 7 and 10 face each other and are a certain distance apart.

To make up the structure 2 that has just been described, the block 3 comprises a substrate 2a, for example made of silicon, on which a first layer 2b, for example made of undoped silica, is deposited followed by a second layer 2c, for example also made of undoped silica. Formed on the upper face of the layer 2b and below the layer 2c are the transmission cores 4a, 7a and 8a of the optical micro-waveguides 4, 7 and 8, for example made of doped silica, or silicon nitride or silicon oxynitride.

As an indication, these transmission cores 4a, 7a and 8a, which are coplanar, are of rectangular or square cross section and have dimensions of between 5 and 14 microns. In addition, for making up the aforementioned optical micro-waveguides, the refractive index of the material forming their respective transmission cores is higher than the refractive index of the material(s) forming the layers surrounding them.

In a variant, the transmission cores of the optical micro-waveguides could be flush with the surface of said block, but in general they would thus be below this surface.

The device 1 furthermore comprises an optical fiber 12, the end parts 12a and 12b of which are engaged, via the top of said surface of the structure, longitudinally in the hollowed-out notches 9 and 10 in such a way that its end surfaces are in contact with the faces 9a and 10a of the notches 9 and 10. These end parts 12a and 12b of the optical fiber 12 are fixed in the hollowed-out notches 9 and 10, for example by cementing. In the example shown, the optical fiber is not stretched out, rather it has curved parts giving it the definition of a double curvature in the form of an elongate S, the fiber leaving the notches via two curved parts.

Thus, that part of the optical fiber 12 which extends between its end parts engaged in the notches 9 and 10 from which they emerge upward straddles, over a certain distance, the upper surface 11a of the block 11 that separates these notches and below which surface the longitudinal integrated optical micro-waveguide 4 is provided.

In the example shown, the longitudinal notches 9 and 10 in the block 3 are of V-shaped cross section and are hollowed out in such a way that the transmission core 12a of the fiber 12 is, in its end parts 13 and 14, in alignment with the transmission cores 7a and 8a of the integrated optical micro-waveguides 7 and 8 respectively.

It follows from the above description that an optical wave traveling in the integrated optical micro-waveguide 7, the optical fiber 12 and the integrated optical micro-waveguide 8, in one direction or in the other, passes from one side to the other of the integrated optical micro-waveguide 4 in which another optical wave travels, in one direction or in the other.

Figure 4:
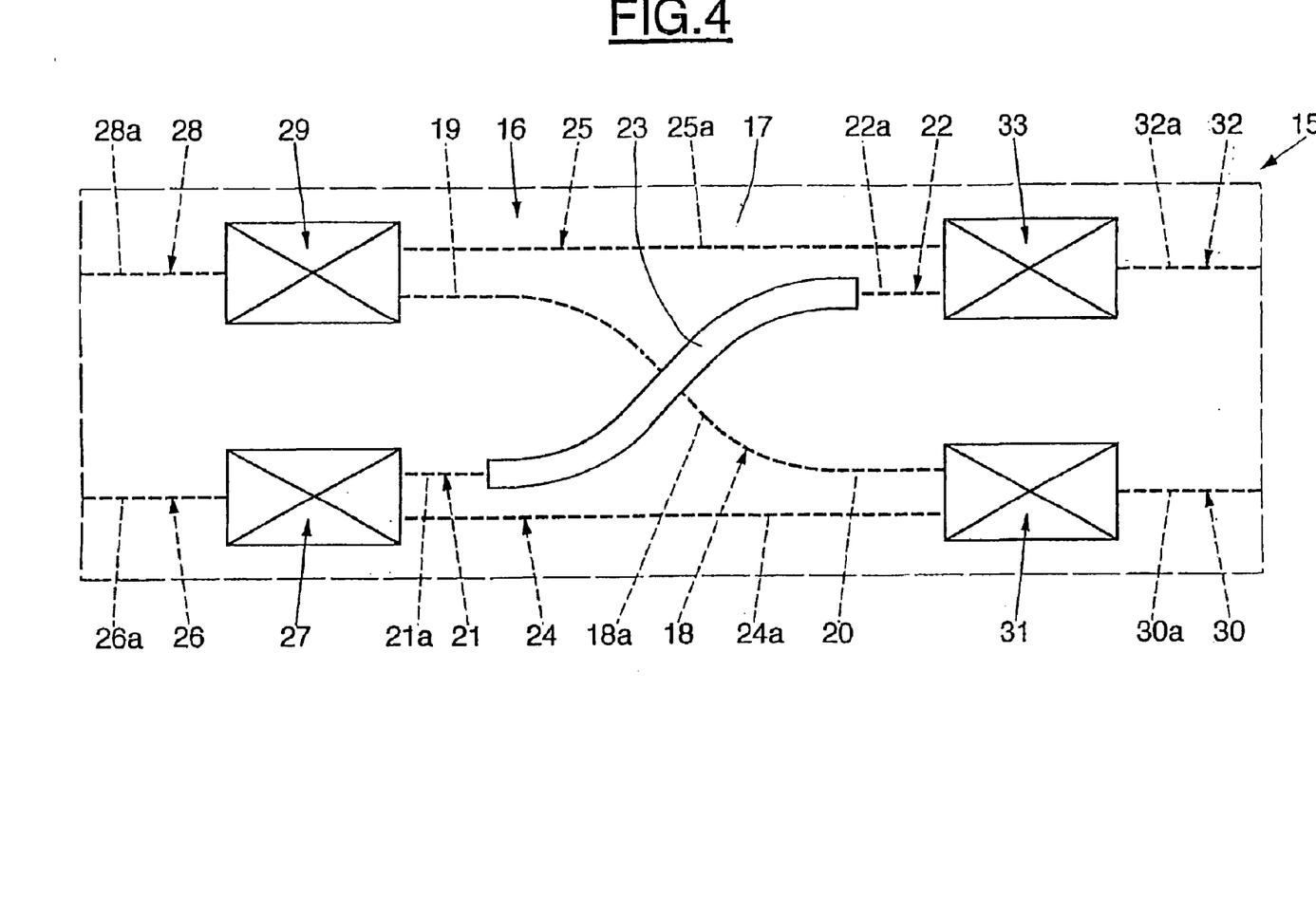
FIG. 4 shows a top view of a switching optical wave transmission device employing the device in FIGS. 1 to 3.
Figure 5:
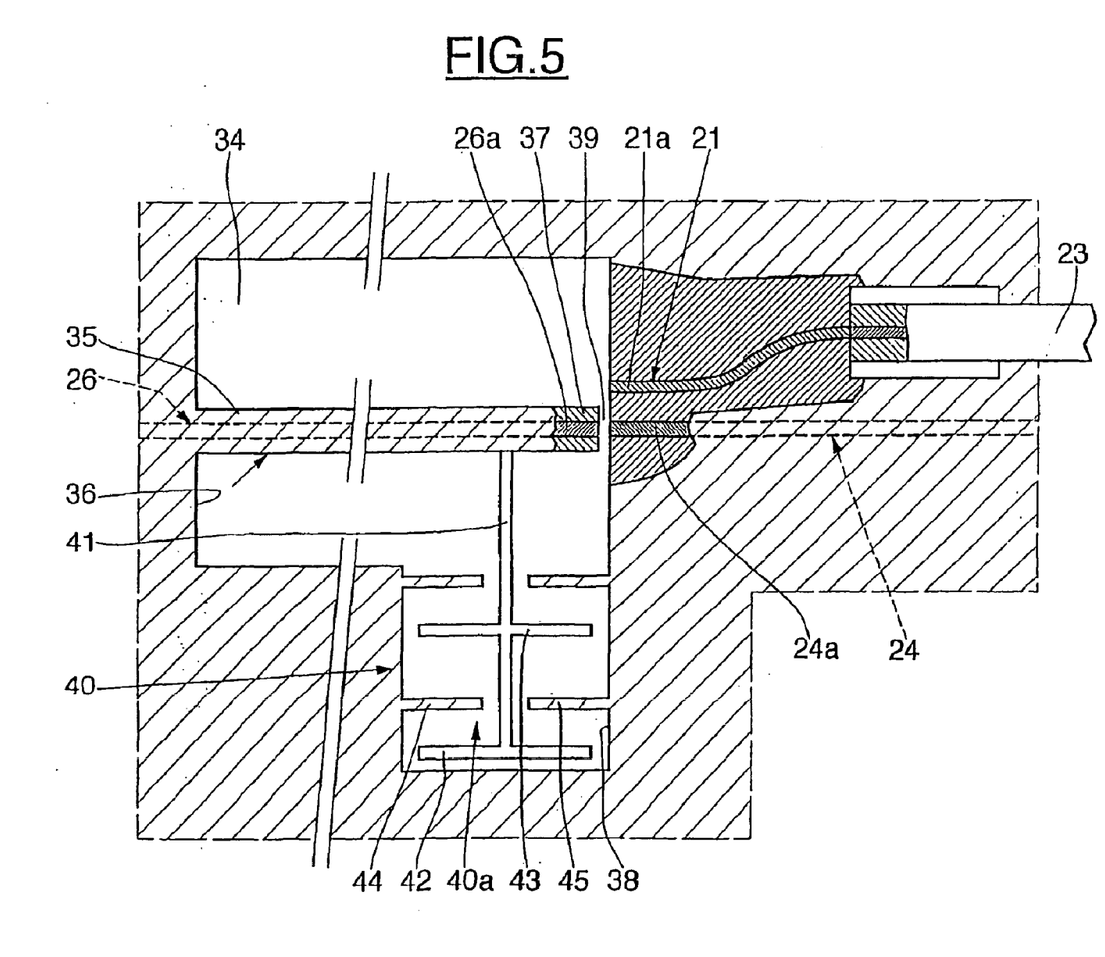
FIG. 5 shows a horizontal section of the transmission device in FIG. 4.

FIGS. 4 and 5 show an optical wave transmission device 15 which forms an optical switching device and employs the optical wave transmission device shown in FIGS. 1 to 3.

This device 15 comprises a structure 16 having optical micro-waveguides integrated into a block 17 and formed in the same plane.

A first integrated optical micro-waveguide 18 has a transmission core 18a in the form of an elongate S in such a way that its end parts 19 and 20 extend longitudinally and are offset transversely.

A linking integrated optical micro-waveguide 21 has a transmission core 21a which lies in alignment with the end part 20 of the optical micro-waveguide 18 and a linking integrated optical micro-waveguide 22 has a transmission core 22a which lies in alignment with the end part 19 of the optical micro-waveguide 18. The linking optical micro-waveguides 21 and 22 are thus placed on each side of the optical micro-waveguide 18 and at a certain distance from the latter.

The facing ends of the integrated optical micro-waveguides 21 and 22 are connected via an optical fiber 23 as described with reference to FIGS. 1 to 3, this fiber straddling the surface of the block 17 below which the integrated optical waveguide 18 is provided.

Second and third integrated optical micro-waveguides 24 and 25 have transmission cores 24a and 25a which extend longitudinally, on either side of the assembly formed by the integrated optical micro-waveguides as described above.

The structure 16 furthermore includes, on each side of its zone in which the assembly comprising the aforementioned optical micro-waveguides and the optical fiber 23 is provided, four auxiliary integrated optical micro-waveguides 26, 28, 30 and 32 which extend longitudinally and can be selectively connected to the aforementioned optical micro-waveguides in the following manner.

The transmission core 26a of the auxiliary optical micro-waveguide 26 can be optically coupled either to the transmission core 21a of the linking micro-waveguide 21 or to the transmission core 24a of the micro-waveguide 24 via an optical switch 27.

The transmission core 28a of the auxiliary optical micro-waveguide 28 can be optically coupled either to the transmission core 18a of the micro-waveguide 18, at the end of its part 19, or to the transmission core 25a of the micro-waveguide 25 via an optical switch 229.

The transmission core 30a of the auxiliary optical micro-waveguide 30 can be optically coupled either to the transmission core 18a of the micro-waveguide 18, at the end of its part 20, or to the transmission core 24a of the micro-waveguide 24 via an optical switch 31.

The transmission core 32a of the auxiliary optical micro-waveguide 32 can be optically coupled either to the transmission core 22a of the linking micro-waveguide 22, or to the transmission core 25a of the micro-waveguide 25 via an optical switch 33.

An illustrative example of the optical switch 27 will now be described with reference to FIG. 5, it being possible for the optical switches 29, 31 and 33 to have equivalent structures.

The block 17 has a cavity 34 in which a longitudinal flexible beam 35 is cantilevered from a vertical wall 36 of this cavity 24. The end surface 37 of the beam 35, perpendicular to its longitudinal direction, extends parallel to and a short distance from a vertical surface 38 of the cavity 34 parallel to its vertical wall 5, forming a space 39 between these surfaces 37 and 38.

The optical micro-waveguide 26a runs along the beam 35 as far as its end 37.

The optical micro-waveguides 21a and 24a open into the cavity 34 on its surface 38.

The flexible beam 35 is provided with an actuating member 40, in particular as suggested by patent FR-A-90/03902 and is formed more particularly in the following manner.

In the cavity 34, the flexible beam 35 has, at a short distance from its end 37, a lateral arm 41 which supports, on each side, longitudinal branches 42 and 43 between which respectively extend, at a certain distance away, branches 44 and 45 made so as to project into the cavity 34 from the opposed vertical walls of this cavity.

The facing vertical faces of the branches 42 and 43 on the one hand and of the branches 44 and 45 on the other are coated with metal layers (not shown) so as to form the electrodes of a capacitive or inductive driving member 40a. These electrodes are connected to electrical supply lines (not shown), for example via tracks and/or wire bridges (not shown).

The driving member 40 is designed so as to be capable of being electrically controlled in such a way that the flexible beam 35 can deform, in order to occupy two extreme positions in which the end surface of the transmission core 26a of the auxiliary optical micro-waveguide 26 can be optically coupled either to the end surface of the transmission core 21a of the linking optical micro-waveguide 21 or to the end surface of the transmission core 24a of the optical micro-waveguide 24.

The arrangement shown in FIG. 4 consequently forms an optical switching device for switching two optical channels to two optical channels in which the incoming optical waves and the outgoing optical waves travel in the same longitudinal direction.

This is because, by selectively controlling the devices 40a for driving the switches 27, 29, 21 and 34, the optical input/output micro-waveguide 26 and 28 may be selectively connected to the auxiliary output/input optical micro-waveguide 30 and 32 without any optical waveguide crossing itself because of the existence of the optical fiber 23 which constitutes a bridge for passing above the optical micro-waveguide 18.

Figure 6:
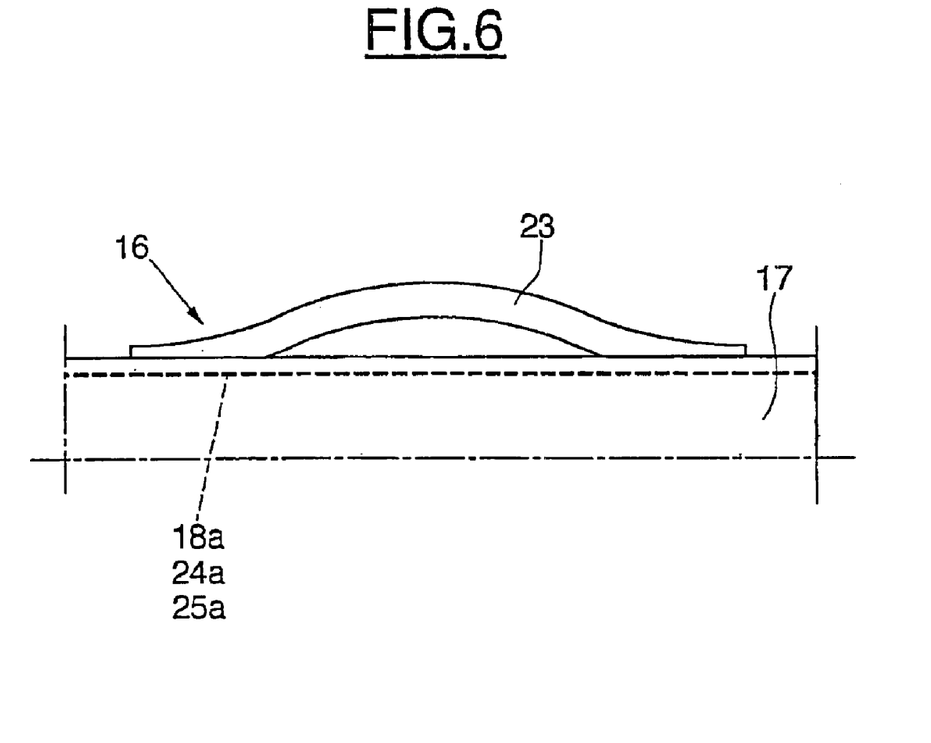
FIG. 6 shows a side view of the device in FIG. 4.

An optical wave transmission device 46 will now be described with reference to FIG. 6, said device forming an optical switching device and also employing the structure of the optical wave transmission device described previously with reference to FIGS. 1 to 3.

The block 47a with integrated optical micro-waveguides of the structure 48 of the device 46 has a cavity 49 in which, as in the example described with reference to FIG. 5, a cantilevered longitudinal beam lies, which beam, this time, comprises four longitudinal branches 51, 52, 53 and 54 spaced apart transversely, the end surfaces of which lie a short distance from a transverse wall 55 of the cavity 49. Thus, the stiffness of the beam 50 may be determined by the cross sections of its branches 51–54.

The branches 51–54 of the beam 50 have, longitudinally and right to their aforementioned ends, the transmission cores 56a, 57a, 58a and 59a of four integrated auxiliary optical micro-waveguides 56, 57, 58 and 59.

Near their ends, the branches 51–54 of the beam 50 are connected via transverse members 60, 61 and 62. The lateral branch 54 supports a lateral arm 63 connected to an actuating member 64, for example one equivalent to the actuating member 40 of the example described with reference to FIG. 5.

Thus, as in that example, the ends of the branches 51–54 forming the beam 50 can be moved horizontally, facing the surface 55 of the cavity 49, by the driving member 64.

The structure 48 furthermore includes, in that part of the block 47 facing the end of the beam 50, two integrated optical micro-waveguides 65 and 66 whose transmission cores 65a and 66a form horseshoe-shaped loops and whose ends open longitudinally into the cavity 49 through its wall 55, facing the ends of the branches 51 and 52 on the one hand and 53 and 54 on the other, respectively.

Provided near the four end parts of the integrated optical micro-waveguides 65 and 66 are four linking optical micro-waveguides 67, 68, 69 and 70 whose transmission cores 67a, 68a, 69a and 70a extend longitudinally open into the cavity 49 through its wall 55.

The linking optical micro-waveguides 67 and 70 on the one hand and the linking optical micro-waveguides 68 and 69 on the other are optically connected by optical fibers 71 and 72 according to the arrangements described with reference to FIGS. 1 to 3.

These optical fibers 71 and 72 are curved in the form of a horseshoe and pass above the surface of the block 47 in such a way that the optical fiber 71 straddles the integrated optical micro-waveguide 65 and the optical fiber 72 straddles the integrated optical micro-waveguide 66.

The driving member 64 is designed to deform the beam 50 in such a way that its branches 51–54 connected via the cross members 60–62 can move between two extreme positions.

When the beam 50 is in one extreme position, the optical micro-waveguide 56 of the branch 51 is optically connected to the optical micro-waveguide 59 of the branch 54, via the linking optical micro-waveguides 67 and 70 and the optical fiber 71, and the optical micro-waveguide 57 of the branch 52 is optically connected to the optical micro-waveguide 58 of the branch 53, via the linking optical micro-waveguides 68 and 69 and the optical fiber 72.

When the beam 52 is in its other extreme position, the optical micro-waveguide 56 of the branch 51 and the optical micro-waveguide 57 of the branch 52 are optically connected via the optical micro-waveguide 65 and the optical micro-waveguide 58 of the branch 53 is optically connected to the optical micro-waveguide 59 of the branch 54 via the optical micro-waveguide 66.

Figure 7:
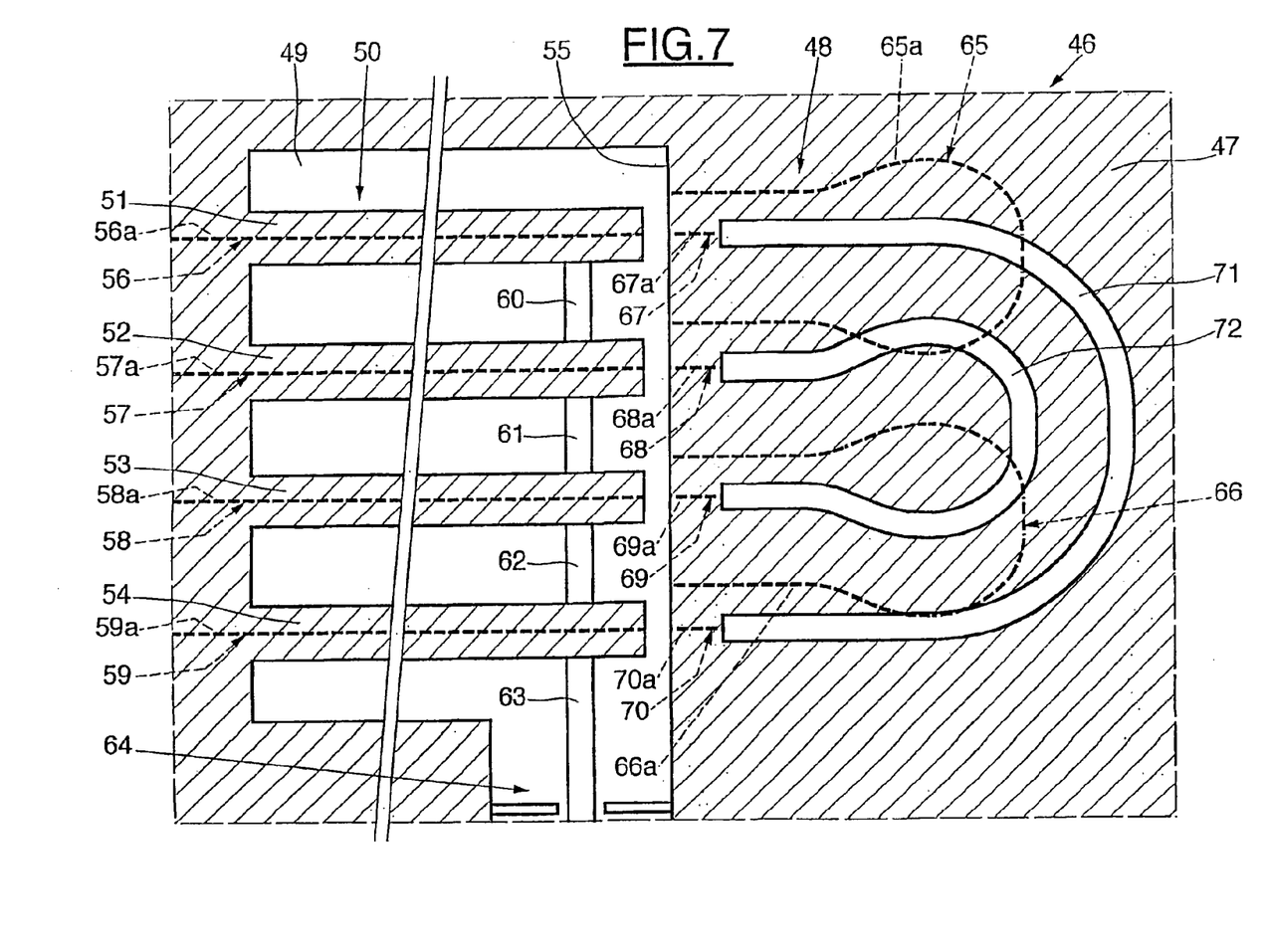
FIG. 7 shows a top view of another switching optical wave transmission device employing the device in FIGS. 1 to 3.

The arrangement shown in FIG. 7 consequently forms an optical switching device for switching two optical channels to two optical channels, in which the incoming and outgoing optical waves travel longitudinally in opposite directions via the beam 50.

Figure 8:
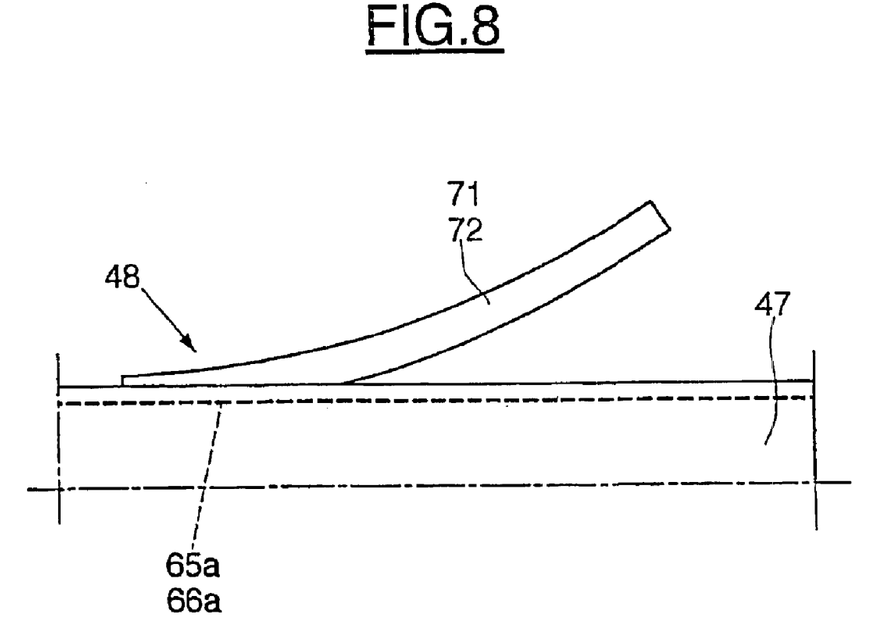
FIG. 8 shows a side view of the device in FIG. 7.
Figure 9:
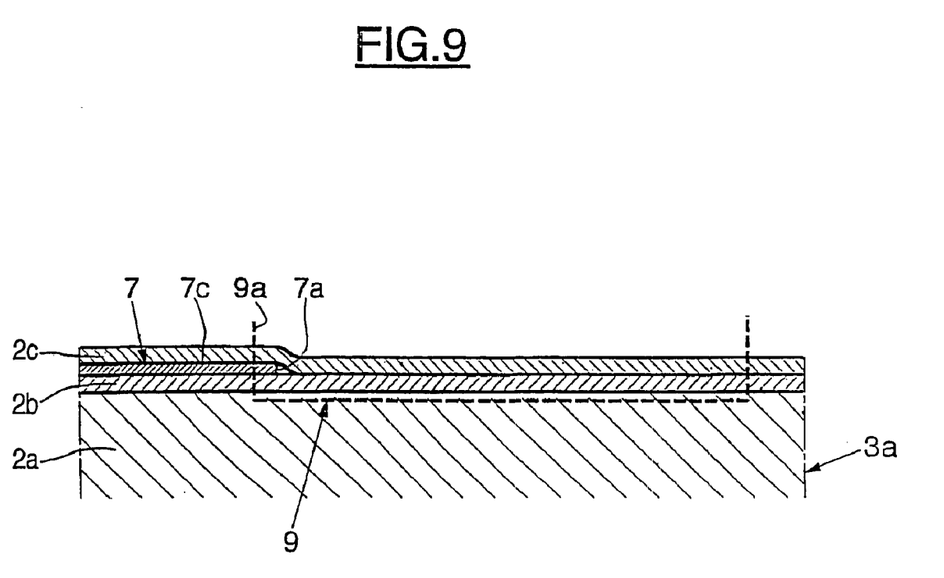
FIG. 9 shows a cross section of the transmission device in FIGS. 1 to 3 during fabrication.

The manner in which the longitudinal notches 9 and 10 of the block 3 of the integrated structure 2, described with reference to FIGS. 1 to 3, may be fabricated will now be described with reference to FIGS. 8 and 9, taking the notch 9 as example.

A block 3a comprising the micro-waveguide 7 is fabricated, the transmission core 7a of said micro-waveguide having an end 7b located in the region of the notch 9 to be produced and at a certain distance from the edges of the surface of the structure.

Next, using a photolithography and etching process, the trench-shaped notch 9 is hollowed out in such a way that this operation cuts away, for example by a few microns, the end part 7c of the transmission core 7a, forming the end surface 9a and an opposed end surface, which extend perpendicular to the longitudinal direction of this core 7a and of the notch 7, and the longitudinal surfaces for the lateral support of the optical fiber, the edges of the notch not reaching the edges of the surface 11 of the structure.

Thus, positioning the notch 7 is not affected by the position of the end 7b of the transmission core 7a. In addition, the end surface of this transmission core 7a may coincide exactly with the end wall 9a of the notch 7 in such a way that the optical coupling between the transmission core 7a and the transmission core 12a of the optical fiber 12 may be of excellent quality.

In another application example (not shown) of the arrangements in FIGS. 1 to 3, an integrated structure could comprise two input channels and two output channels between which would be respectively placed an optical demultiplexer, each of the lines of which transmit one or more particular wavelengths, and an optical multiplexer. Using one or more optical fibers mounted as described above, it would be possible to extract an optical wave at a given wavelength from one line of one of the input channels so as to introduce it into the other output channel.

Such an arrangement thus constitutes a switch for switching part of an optical wave from one channel to another channel.

The present invention is not limited to the examples described above. Many alternative embodiments are possible without departing from the scope defined by the appended claims.

What is claimed is:

1. An optical wave transmission device comprising an integrated structure having integrated optical wave guiding means, characterized in that the structure comprises hollowed parts or notches (9, 10) made on each side of at least one integrated optical guiding means (4) which extends below or is flush with a surface (11a) of the structure and separating said hollowed parts, in that said hollowed parts or notches (9, 10) are designed to receive and fix therein the end parts (13, 14) of an optical fiber that straddles said surface (11a) and in that the ends of said optical fiber are optically coupled to integrated optical guiding means (7, 8), respectively.

2. The device as claimed in claim 1, characterized in that the structure has a deformable part (35) provided with at least one auxiliary optical guiding means (26) and in that an actuating means (40) is designed to move this deformable part between a first position and a second position so that an end surface of this auxiliary optical guiding means is optically coupled either to one end of said optical fiber or to an end surface of an integrated optical waveguide of said structure which extends below the aforementioned surface.

3. The device as claimed in claim 1, characterized in that the structure comprises a first integrated optical waveguide (18) which extends below the aforementioned surface and second and third integrated optical waveguides (24, 25) which extend to the outside of this surface, in that the structure has at least two deformable parts (27, 29) provided respectively with an auxiliary optical guiding means and in that the structure is provided with two actuating means designed to move the respective said deformable parts between a first position and a second position so that, on the one hand, an end surface of a first auxiliary optical guiding means is optically coupled either to an end surface of the first integrated optical waveguide or to an end surface of the second integrated optical waveguide and, on the other hand, an end surface of a second auxiliary optical guiding means is optically coupled either to an end surface of said optical fiber or to an end surface of the third integrated optical waveguide.

4. The device as claimed in claim 1, characterized in that the structure supports two optical fibers (71, 72) and has two integrated optical waveguides (65, 66), in that the structure has a deformable part (50) provided with at least four auxiliary optical guiding means (56–59) and in that the structure is provided with an actuating means (64) designed to move this deformable part between a first position and a second position so that an end surface of the auxiliary optical guiding means is optically coupled, selectively and respectively, to the two ends of the two optical fibers and the two ends of the two integrated optical waveguides.

5. The device as claimed in claim 4, characterized in that said deformable part (50) comprises branches (51–54) connected together, each of which is provided with an optical guiding means (56–59).

6. The device as claimed in claim 2, characterized in that the end of said optical fiber is optically coupled to the end surface of said auxiliary optical guiding means via an integrated optical guiding means (67–70) of the structure.

7. The device as claimed in claim 2, characterized in that the deformable part comprises a cantilevered flexible beam (35; 50), which supports the one or more auxiliary optical guiding means (26; 56, 59) longitudinally, and stressing means (40; 64) for deforming this beam so as to move its end.

8. The device as claimed in claim 7, characterized in that the stressing means comprise capacitive means or inductive means (40a) that deliver a force for stressing said beam owing to the effect of an electrical current and/or an electrical voltage that are delivered by control means.

9. The device as claimed in claim 3, characterized in that the end of said optical fiber is optically coupled to the end surface of said auxiliary optical guiding means via an integrated optical guiding means (67–70) of the structure.

10. The device as claimed in claim 4, characterized in that the end of said optical fiber is optically coupled to the end surface of said auxiliary optical guiding means via an integrated optical guiding means (67–70) of the structure.

11. The device as claimed in claim 5, characterized in that the end of said optical fiber is optically coupled to the end surface of said auxiliary optical guiding means via an integrated optical guiding means (67–70) of the structure.

12. The device as claimed in claim 3, characterized in that the deformable part comprises a cantilevered flexible beam (35; 50), which supports the one or more auxiliary optical guiding means (26; 56, 59) longitudinally, and stressing means (40; 64) for deforming this beam so as to move its end.

13. The device as claimed in claim 4, characterized in that the deformable part comprises a cantilevered flexible beam (35; 50), which supports the one or more auxiliary optical guiding means (26; 56, 59) longitudinally, and stressing means (40; 64) for deforming this beam so as to move its end.

14. The device as claimed in claim 5, characterized in that the deformable part comprises a cantilevered flexible beam (35; 50), which supports the one or more auxiliary optical guiding means (26; 56, 59) longitudinally, and stressing means (40; 64) for deforming this beam so as to move its end.

15. The device as claimed in claim 6, characterized in that the deformable part comprises a cantilevered flexible beam (35; 50), which supports the one or more auxiliary optical guiding means (26; 56, 59) longitudinally, and stressing means (40; 64) for deforming this beam so as to move its end.

* * * * *